US007002908B1

(12) United States Patent
Lund et al.

(10) Patent No.: US 7,002,908 B1
(45) Date of Patent: Feb. 21, 2006

(54) INTERCONNECTION LINK REDUNDANCY IN A MODULAR SWITCH NODE

(75) Inventors: Peter C. Lund, Skärholmen (SE); Per E. Sydhoff, Hagersten (SE); Bo Jerker Karlander, Sollentuna (SE); Kenneth Browall, Runmaro (SE); Hans A. Berghager, Alvsjö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/514,144

(22) Filed: Feb. 28, 2000

(51) Int. Cl.
*H04J 1/165* (2006.01)
*H04L 12/66* (2006.01)
*H04L 12/56* (2006.01)

(52) U.S. Cl. ............... 370/228; 370/248; 370/356; 370/392; 370/400

(58) Field of Classification Search ........... 370/227, 370/228, 395.1, 397, 395.31, 400, 469, 217, 370/236.2, 352–356, 389, 392, 401, 409, 370/420, 463, 524
See application file for complete search history.

(56) References Cited

U.S. PATENT DOCUMENTS

| | | | | |
|---|---|---|---|---|
| 5,278,977 A | * | 1/1994 | Spencer et al. | 714/3 |
| 5,627,822 A | * | 5/1997 | Edmaier et al. | 370/218 |
| 5,729,527 A | * | 3/1998 | Gerstel et al. | 370/228 |
| 5,822,299 A | * | 10/1998 | Goodman | 370/228 |
| 5,959,972 A | | 9/1999 | Hamami | |
| 6,549,513 B1 | * | 4/2003 | Chao et al. | 370/227 |
| 6,760,302 B1 | * | 7/2004 | Ellinas et al. | 370/228 |
| 6,917,986 B1 | * | 7/2005 | Mor et al. | 709/238 |

FOREIGN PATENT DOCUMENTS

EP    0 609 869    8/1994

OTHER PUBLICATIONS

"A New Distributed Switching System Architecture For B-ISDN", Tanabe et al., Proceedings of the International Conference on Integrated Broadband Services and Networks, GB, Stevenage, IEEE, vol. _, Oct. 15, 1990, pp. 258-263, XP00410615.
"Memory And Channel-Sharing Techniques For Congestion Control In ATM Networks", Kai et al., Proceedings Of The Annual Joint Conference Of The Computer And Communications Societies (Infocom), U.S. Los Alamitos, IEEE Comp. Soc. Press, vol. Conf. 12, Mar. 28, 1993, pp. 266-273, XP000419741, ISBN: 0-8186-3580-0.
"ATM Switch Chips Switch On Net Reliability", EDN Electrical Design News, US, Cahners Publishing Co., Newton, Massachusetts, vol. 42, No. 14, Jul. 3, 1997, pp. 89-98, XP000732748 ISSN: 0012-7515.

* cited by examiner

*Primary Examiner*—Frank Duong
*Assistant Examiner*—Melanie Jagannathan
(74) *Attorney, Agent, or Firm*—Nixon & Vanderhye P.C.

(57) ABSTRACT

The present invention provides interconnection links between modules in a switch node. A redundant physical link couples the modules and a dual state data packet routing tag is used to identify which link is active. A standard tag received from an application device is converted to the dual state data packet routing tag, after the data leaves the application device so the interconnection link routing is essentially invisible to the application layer.

28 Claims, 6 Drawing Sheets

INTERCONNECTION LINK REDUNDANCY IN A MODULAR SWITCH NODE

FIELD OF THE INVENTION

This invention relates to ATM switches, and more particularly to interconnection link redundancy within an ATM node.

BACKGROUND AND SUMMARY OF THE INVENTION

ATM based telecommunications networks are arranged with a number of ATM switch nodes communicating with one another. A design and structure of switch nodes are well known and may take a variety of different forms. As the switch nodes become increasingly large in terms of their capacity to handle data, the physical structure for the node may (and likely will) exceed one physical switch module of boards (for example, one rack). Thus, for many telecommunication nodes, the physical infrastructure for the node is often based on several physical switch modules, each containing a number of boards. The modules communicate with one another via internal links such that the entire system of modules acts as a single cohesive node unit. The reliability of the interconnection links between the several modules in such a large node is crucial. If any link fails between the number of modules, the entire operation of the node is jeopardized. Accordingly, physical redundancy in the interconnection links between modules within a node is preferable.

Several methods for link redundancy are present on the market that require the applications running at the node to closely participate in any changeover process from a first link to a redundant second one. Thus, as shown in FIG. 2, a switch node is viewed as a number of layers ranging from, in the example of FIG. 2, power distribution in the bottom layer 28 up to network layer routing and/or connection termination functions with application processing in the upper layer 20. The problem commonly associated with the prior art is that the upper layers (20) that run an application are involved in a changeover process from one interconnection link to another (at layer 22). Redundancy operations at layer 22 should occur independently, as much as possible, of the operations of the application in layer 20. If possible, redundancy changeovers at layer 22 should have no or very small interaction with other layers in FIG. 2.

The present invention isolates the interconnection link redundancy layer by re-routing of traffic flows, either packets or cells, from a failed first interconnection link to another redundant such link between interconnected switch modules, without any involvement of functions in the higher layer. When a connection is set up, a state condition is determined as to which one within a pair of switch module interconnection links is the primary link over which the packet flow on the connection shall be routed. A corresponding routing tag is then attached to each packet on the node-internal connection. If the state of the selected interconnection links changes to a non-operational state, the packet routing will be changed by means of changing the translation of the routing tag within the interconnection link layer so that the packets will be forwarded via the secondary link. Interconnection link redundancy is obtained with minimal interaction to the application layer.

With the present invention, interconnection link redundancy is obtained with minimal interaction to the application layer.

These, as well as other objects and advantages of this invention, will be more completely understood and appreciated by careful study of the following more detailed description of a presently preferred exemplary embodiment of the invention taken in conjunction with the accompanying drawings, of which:

DETAILED DESCRIPTION OF THE PRESENTLY PREFERRED EMBODIMENT

Figure 1:
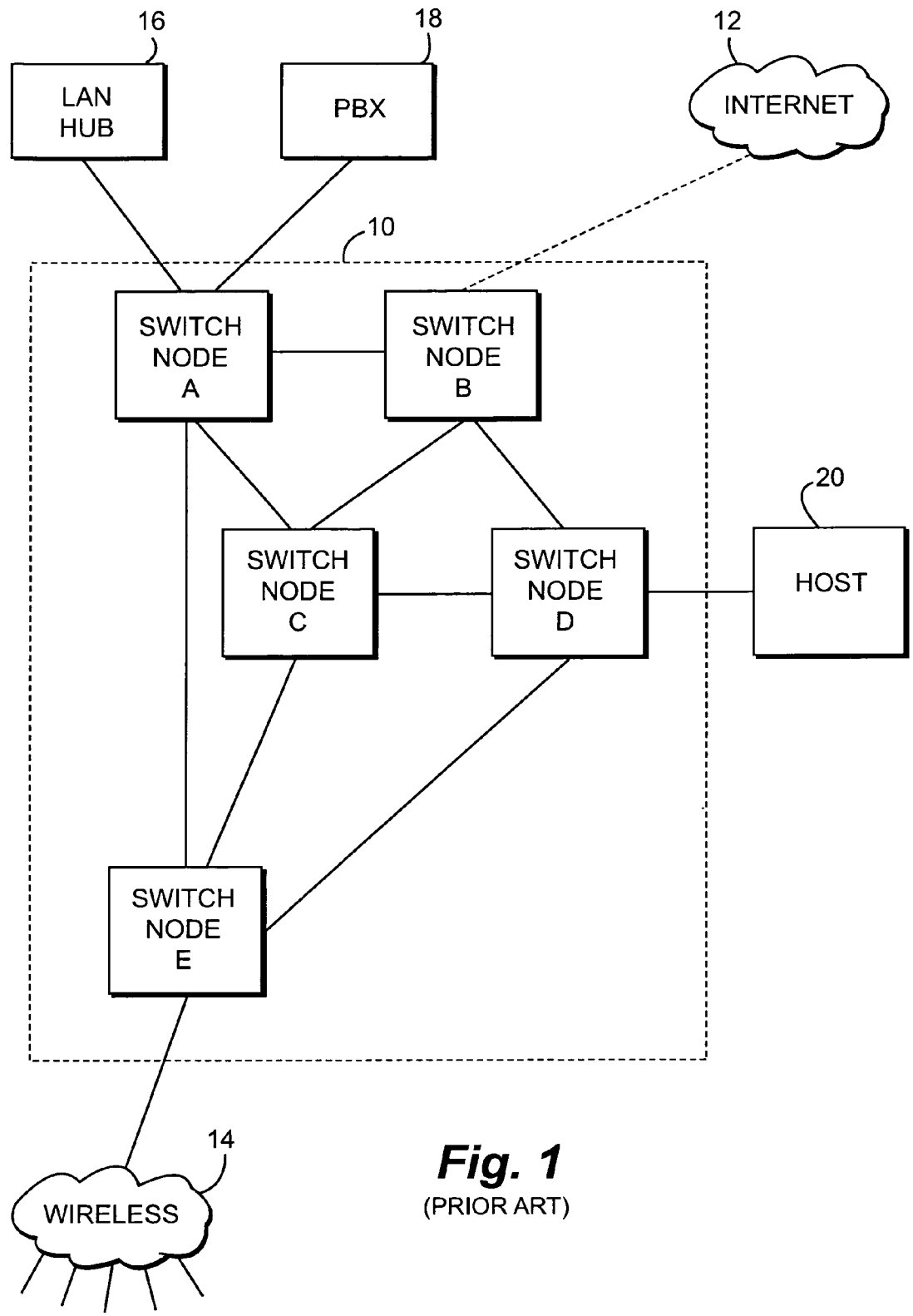
FIG. 1 is a schematic diagram of an example of a telecommunications network.

FIG. 1 illustrates an example embodiment of the telecommunications system, within which the present invention may be employed. Telecommunications system 10 includes a number of switch nodes A–E communicating with each other through various communication paths. Switch nodes A, B, D, and E provide access points for external devices and networks, such as LAN hub 16, PBX 18, Internet 12, host 20, wireless telecommunications network 14, etc. Of course, many other types of external devices and networks may be associated with the network as a whole by simply adding additional switch nodes or by linking them to one of the pre-existing switch nodes. The present invention is not meant to be limited to the embodiment of FIG. 1, but such embodiment is shown to provide an example application in which the present invention may be embodied.

The present invention could be employed in any one of the switch nodes A–E of FIG. 1. As switch node A, for example, increases in size (meaning that its capacity to handle data from LAN hub 16, PBX 18, or new external devices increases), the physical structure of switch node A will begin to exceed the practical capacity of a physical rack. In such a case, the switch node A is typically divided into two modules communicating with each other. Together, the two modules then comprise the switch node A. Further division can also be envisioned (and frequently occurs) such that one switch node may comprise a number of switch modules communicating one with the others via internal switch node links.

Figure 3:
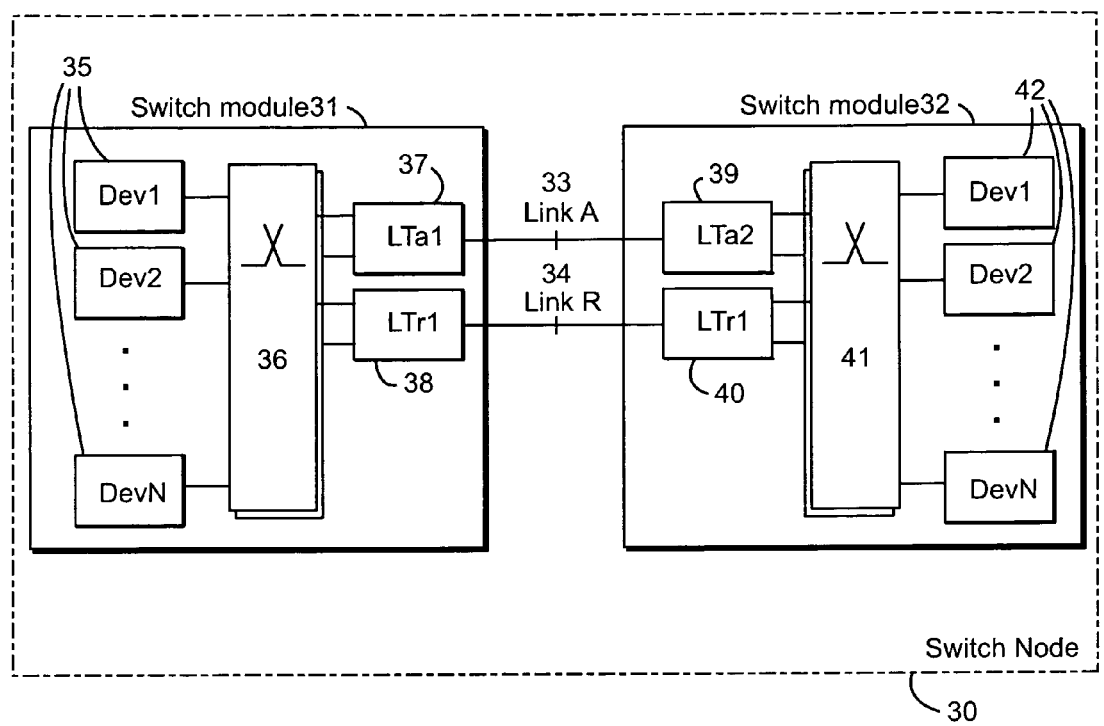
FIG. 3 is a schematic diagram of a switch node in accordance with an example embodiment of the present invention.

FIG. 3 illustrates an example embodiment of such a two module system. There, switch node 30 includes switch module 31 and switch module 32. Switch module 31 includes a certain number of device boards (DEV1, DEV2 . . . DEVn) 35 communicating with a switch core 36. The device boards are for application processing and/or node external interfaces. On the other end of the switch core 36 is a link termination board (LTa1) 37 communicating with Link A 33. Link 33 is a switch module interconnection link in accordance with the present invention. Since switch module 31 and switch module 32 must communicate with each other in order to coherently form together the switch node, it is imperative that link 33 be secure. For that reason, a second link 34 (link R) is provided between switch module 31 and switch module 32 to guarantee operation in the event Link 33 fails. To service Link 34, link termination board 38 is included within switch module 31 to communicate with switch core 36.

In the same way, switch module 32 includes link termination board 39, redundant link termination board 40, switch core 41, and a number of device boards DEV1, DEV2 . . . DEVn 42.

Note that although the present embodiment described in FIG. 3 shows a one-plus-one system, that is a system in which one redundant link 34 is provided for each link 33, the present invention could also be employed in a link redundancy system using a n-plus-one or n-plus-m principle, meaning that one or a set of common redundant links is used to service a number of links.

Further, the present invention is sometimes described herein will reference to "cell" processing, but the invention applies equally well to data packets of variable lengths and to any other data unit switched by the switch core provided the node-internal routing of the data unit over the interconnection links is controlled by a routing tag which can be modified as described.

Figure 2:
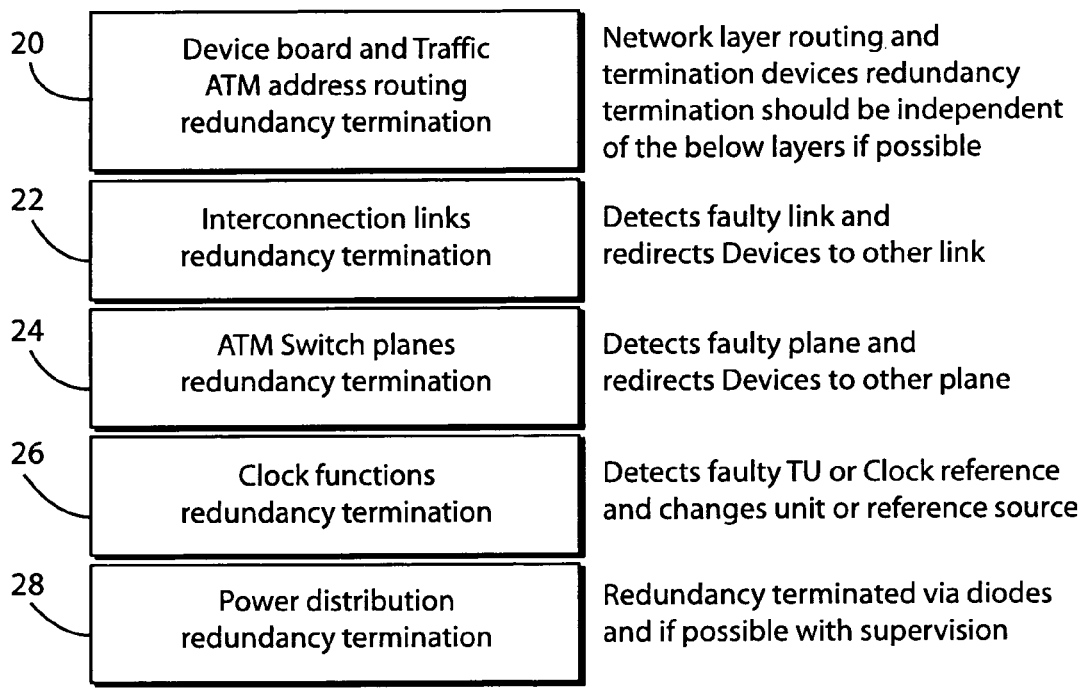
FIG. 2 is a schematic representation of a switch node redundancy layering.

Each switch module 31 and 32 can be viewed in terms of its layering, as shown in FIG. 2. In the example embodiment of FIG. 2, the lowest layer of switch module 31 is power distribution 28. Moving up from the power distribution layer 28, one would find, in order, clock functions 26, ATM switch planes 24, interconnection links 22, and network layer routing and termination devices 20. Ideally, each of the layers 20–28 includes its own redundancy which is as independent as possible from other layers. Thus, as shown in FIG. 2, power distribution layer 28 is redundancy terminated (e.g., via diodes), if possible with supervision. Redundancy operations for layer 26 will detect a faulty timer unit or clock reference and will change the unit or reference source when needed. For layer 24, the redundancy operation detects a faulty switch plane and redirects devices to another plane. Thus, one can see in FIG. 3, a number of switch planes for switch core 36 with the switch planes being redundant to each other for secure operation of layer 24. At layer 22, the redundancy termination of the interconnection links is as described in the present invention herein. Specifically, layer 22 redundancy operates to detect a faulty link and re-direct devices to another link. As described above, ideally the network layer routing and termination devices redundancy terminations should be independent of the layers 22–28, to the greatest extent possible.

Ideally, each layer should be as orthogonal as possible to all others. As an example, if power distribution to a module is fed via the switch boards that also interconnect exchange terminals, then a redundancy termination relationship exists that must be handled properly in the system.

The present invention focuses primarily on the interconnection link redundancy at layer 22. When link faults are discovered using traditional STM/SDH level alarms LOS, AIS, RAI, etc., the present invention re-routes data flow between the switch modules via the alternative physical connection link. Routine testing running in the background over the links 33 and 34 can also be used in addition to the traditional STM/SDH level alarms to discover all link faults, although such routine testing will result in a longer fault period before discovery than the traditional STM/SDH level alarms.

Figure 4:
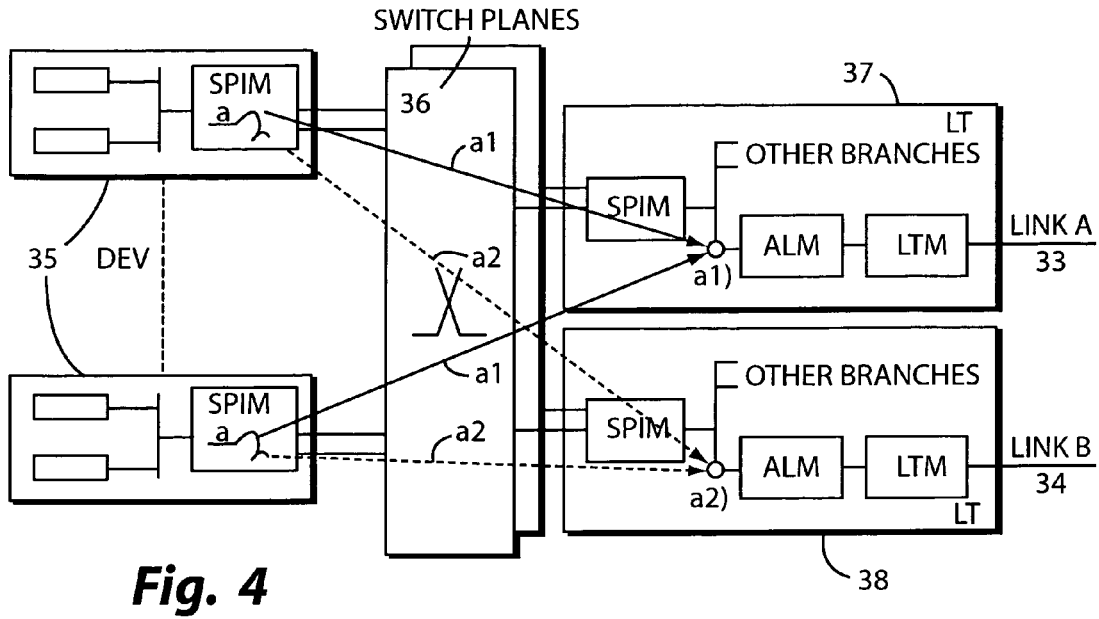
FIGS. 4, 4A, and 5 are example embodiments of switch modules in accordance with the present invention.
Figure 5:
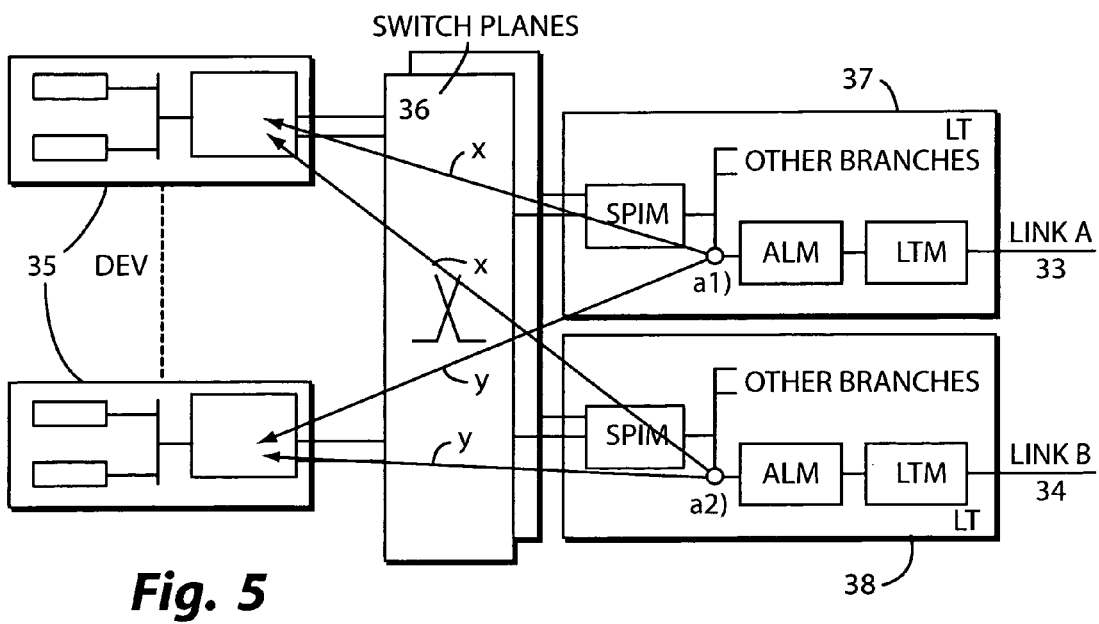

Referring now to FIGS. 4 and 5, the routing system in accordance with an example embodiment of the present invention is described. In FIG. 4, the ingress of data packets onto links 33 and 34 are described. In FIG. 5, the egress of data packets from links 33 and 34 is described.

In FIG. 4, a switch module, such as switch module 31 (FIG. 3) is shown composed of device boards 35 communicating with switch core 36 to link terminations 37 and 38. When a connection is set up, the connection is configured as normal on the device boards 35 using, for example, data packet routing tag "a" when Link A 33 is intended for use (in normal circumstances). The connection is configured on both of the link terminations 37 and 38 with the same switch segment VCI and the same link segment VPI/VCI. The link terminations 37 and 38 include Switch Port Interface Modules (SPIM) communicating with the switch core 36. Also, ATM layer modules ALM communicate with line termination modules LTM, which provide data packets streams to the respective links 33 and 34.

The switch port interface modules SPIM of the link termination boards 37 and 38 are informed of all changes in the current link 33 or 34 being used. That is, in normal operation, link A33 may be the current link of choice, such that both SPIMs of link termination 37 and link termination 38 know that all data packets will run between switch modules 31 and 32 via link 33. When link 33 fails, the dual link state is changed to define the other link 34 as the active link and the SPIMs of the link terminations 37 and 38 and of the device boards 35 are informed of the state change.

Thus, when the data packets with data packets routing tag "a" is sent through switch core 36 by device 35, it is translated by ingress SPIM to either the a1 position shown in FIG. 4 or the a2 position shown in FIG. 4, depending on the dual link state information known by the SPIMs. Thus, in normal operation, data packets routing tag "a" is sent through switch core 36 to link termination 37 and/or 38. Note that the SPIM can operate in alternating embodiments: first, where tag "a" is used to send data packets to both link terminations 37 and 38 (multi-cast mode) or to only the active termination 37 or 38 (uni-cast mode). The advantage of the latter embodiment is: by only sending the data packets to the first link A and not to the second link B, the switch core does not need to support multi-cast. The support of multi-cast functions in a switch core is in some cases difficult and puts higher requirements on the capacity of the switch since data packets are duplicated. In most cases the most appropriate position of a routing tag translation table to perform the routing tag addition/translation described above is at the ingress to the switch, i.e., at the "a" close to 35. The content of the routing tag translation table at "a" will be changed to redirect the data packets to link B at the detection of a fault in link A. Up until that time no data packets are sent to the link B port, i.e., the SPIM in 38.

In the multi-cast mode, SPIM of link termination board 38 receives and blocks further progress of the data packet, while SPIM of link termination board 37 provides the data packet to the ATM layer module ALM (for ultimate application to link 33). When link 33 fails, link 34 becomes the active communication link between switch module 31 and 32, such that SPIM 37 no longer applies the data packets from devices 35 to the point a1, while SPIM of link termination board 38 provides the data packets to point a2.

Figure 4A:
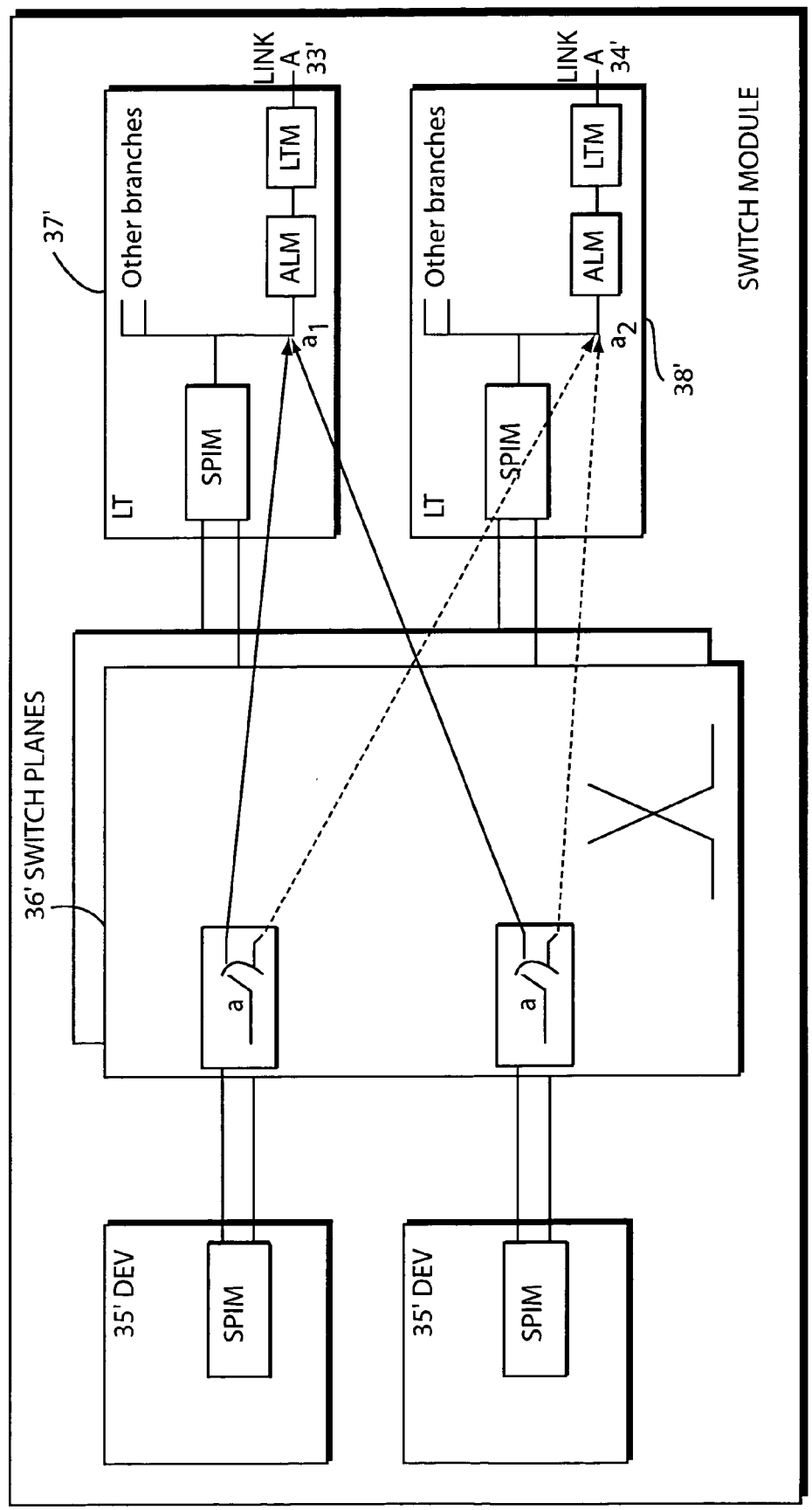

In FIG. 4A, the switch module is similar to that of FIG. 4 except that the "a" tag routing functions are located in the switch core 36' rather than on devices 35. Otherwise elements identified by a "prime" are similarly operating in FIG. 4A as described with respect to their counterpart numbers in FIG. 4. In other words, FIGS. 4 and 4A illustrate that the routing tag translation function can be in the SPIMs or in the switch core.

In FIG. 4A, and with the switch operating in uni-cast mode, the following applies: when the dual link state is changed the routing tag translation functions in the switch core are informed so that they can change the tag translation from the devices as required.

When operating in the multi-cast mode the "a" function will continuously duplicate the data packets to both the "a1" and the "a2" destinations and the SPIMs on exchange 37' and 38' will either transmit or discard the data packets depending on the active or stand-by state of the links A33' and B34'.

Thus, the devices 35' send data packets with tag "a" and the SPIMs of the link termination boards (in the uni-cast mode) or the "a" re-direction function of the switch core (in the uni-cast mode) determine which of the link A33' or B34' that is used. In either multi-cast or uni-cast mode, to the devices 35', the dual linking operation is essentially invisible.

The reconfiguration can cause a loss of data packets which have been previously queued on the link termination board handling the faulty link. It is necessary to ensure that the transmission of data packets via the faulty link has definitely ceased before transmission is switched over to the other link, in order to guarantee the data packet sequence order.

In an alternative embodiment, it is possible to use both the first link 33 and the second link 34 by using two different routing tag values with different translations, as long as both links are operational. That is, both of the links 33 and 34 can be operational in a normal mode until a link fault occurs, at which time only one link becomes operational. It is also contemplated in the present invention to implement two independent internal links on the same link termination board (for example 37) by providing the internal links with different data packet routing tags.

FIGS. 4 and 4A illustrate the path of data packets from the devices 35 onto the links 33 and/or 34. FIG. 5 illustrates the flow of data packets from the links 33 and/or 34 to a device 35. Since each connection is configured on both of the link termination boards 37 and 38, data packets arriving from links 33 and/or 34 will automatically be forwarded to the destination device 35 from whichever link they are received. There is thus no need to inform the link termination boards 37 or 38 about the dual link state since the arriving data packets from the links 33 and 34 will be destined for the appropriate device 35 regardless of the link from which they are received. Thus, no specific action is needed after a link fault in order to accommodate data packets being received from the active link into the devices 35.

Of course, a switchover procedure from a first link to a second link must ensure that data packets in the ingress queue from the first link are forwarded to the destination device before data packets on the same user connections arrive via the second link.

In accordance with the preferred embodiment of the present invention, both directions of data packet flow are relocated to another link when a fault is detected in one link, even if the fault is only in one direction. The invention is not limited to that preferred embodiment.

Once a faulty link is repaired, traffic can be reverted back to the repaired link, again leaving the other link available as a backup. Alternatively, the set of interconnection links can be considered as a pool of links in which the identity of the active link carrying traffic is of no importance. In other words, once a switch occurs from use of a first link to use of a second link, traffic need not revert back to the first link until (and if) there is a subsequent failure in the second link.

Various protocols are contemplated for when the changeover should occur following fault detection. It could be a requirement to state a maximum time to changeover on a fault, regardless of the type of fault.

Figure 6:
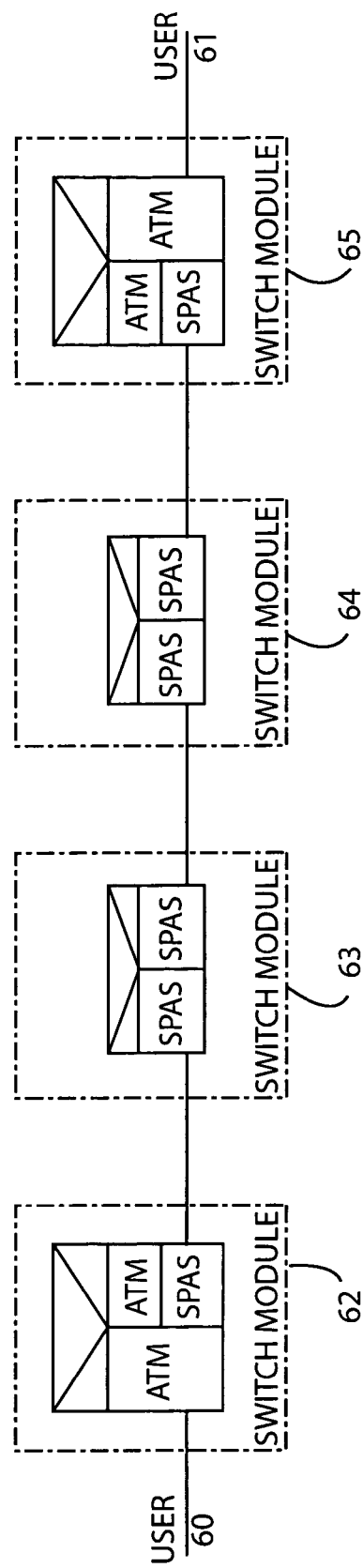
FIG. 6 is a schematic diagram of various switch modules in accordance with another example embodiment of the present invention.

FIG. 6 illustrates another aspect of an example embodiment of the present invention. There, switch modules 62, 63, 64, and 65 are shown comprising a switch node between user 60 and user 61. In accordance with the example embodiment of FIG. 6, ATM switching is provided at the end-points, where users 60 and 61 are located. That is, switch module 62 and 65 provide ATM switching. Between switch module 62 and 65, space switching is provided.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of interlinking first and second switch modules in a common switch node for use in a communications network where the common switch node is coupled to other switch nodes by one or more external links, comprising the steps of:

providing first and second redundant node-internal links between said first and second switch modules contained within the common switch node;

receiving a data packet with a destination address at the first switch module;

over-writing at the first switch module said destination address with a routing tag identifying only an active one of the first and second links; and outputting from the first switch module the data packet only to said active one of said first and second links identified by the routing tag.

2. A method according to claim 1, further including the step of simultaneously receiving at first and second link terminals in said first switch module the data packet having the routing tag.

3. A method according to claim 1, further including the steps of:

passing the data packet through a switch core and therein performing the overwriting step.

4. A method according to claim 1, further including the steps of:

detecting a fault condition in the active one of said first and second links; and thereafter the over-writing step overwrites said destination address with the routing tag identifying the other of said first and second links.

5. A module within a switch node operatively linkable with a second module within the same switch node, comprising:

first and second redundant node-internal links connecting the first module to the second module contained in the switch node; and a routing tagger to receive a stream of data packets destined for the second module and to apply a node-internal routing tag to the data packets in the stream to direct the stream to only one of the first and second redundant links so that only the one link is used to rotate the data packets to the second module;

a set of device boards outputting the data packets with standard addresses;

a switch core in communication with the set of device boards to receive the data packets and overwrite the standard addresses with the node-internal routing tags;

first and second redundant link terminals in communication with the switch core;

the first link coupled to the first link terminal and to the second module, said first link associated with a first unique one of the routing tags; and the second link coupled to the second link terminal and to the second module, said second link associated with a second unique one of the routing tags.

6. A module according to claim 5, wherein:

at least one of said first and/or second link terminals receive the data packets;

the first link terminal passes the data packets to the first link if the switch core overwrites the standard address with the first unique one of the routing tags; and the second link terminal passes the data packets to the second link if the switch core overwrites the standard address with the second unique one of the routing tags.

7. A module as in claim 6, wherein both the first and second link terminals receive said data packets, and one of the first and second link terminals blocks the passage of said data packets to a corresponding one of the first and second links.

8. A module as in claim 6, wherein both the first and second link terminals receive said data packets, and one of the first and second link terminals also blocks the passage of said data packets to a corresponding one of the first and second links until the overwrite changes from a current one of the first and second routing tags to the other of the first and second routing tags.

9. A module according to claim 6, wherein:

said set of device boards create said data packets without regard to the redundancy of the first and second links.

10. A module according to claim 6, wherein:

said switch core overwrites the standard addresses with the first unique one of said routing tags under a first operational condition, and said switch core overwrites the standard addresses with the second unique one of said routing tags under a second operational condition different from said first operational condition.

11. A module according to claim 10, wherein the first operational condition identifies a detected normal condition in the first link and the second operational condition identifies a detected fault condition in the first link.

12. A single switch node comprising within the physical boundaries of that node:

first and second switch modules operatively linked to each other within the single switch node, each module containing:

a set of device boards for outputting data packets having standard routing tags;

a switch core in communication with the set of device boards to receive the data packets and overwrite the standard routing tags with modified routing tags;

first and second redundant link terminals in communication with the switch core;

a first node-internal link coupled to the first link terminal and to the other of said modules, said first link associated with a first unique one of said modified routing tags; and a second node-internal link, redundant to the first link, coupled to the second link terminal and to the other of said modules, said second link associated with a second unique modified routing tag, wherein:

at least one of said first and second link terminals configured to receive said data packets, and wherein:

said first link terminal is configured to pass said data packets to the first link when the switch core overwrites said standard routing tag with said first unique one of said modified routing tags, and said second link terminal is configured to pass said data packets to the second link when the switch core overwrites said standard routing tag with said second unique one of said modified routing tag.

13. A switch node according to claim 12, further including:

a third module between said first and second modules, comprising a space switching module.

14. A switch node according to claim 12, further including:

a plurality of modules between said first and second modules, each comprising a space switching module.

15. A switch module for use in a switch node, comprising:

a power distribution layer;

a clock function layer in communication with the power distribution layer;

switch planes in communication with the clock functions layer;

an interconnection links layer for connecting to another interconnection links layer of another of said set of switch modules via at least first and second redundant links, said interconnection links layer for detecting faults in said links and redirecting communication to one of said first and second links whenever faults are detected in the other of said links; and an applications layer in communication with the interconnection links and providing data packets to said interconnection links layer, said applications layer operating independently of said detecting and re-directing aspects of said interconnection links layer.

16. A switch node comprising:

a first switch module operatively communicating with a second switch module through a set of links, said set of links including a first set of links actively carrying data packets between the first and second modules and at least one extra link that remains idle until a failure is detected in any one of the first set of links, whereupon the extra link takes the place of the failed link in carrying assigned ones of said data packets, each switch module including:

a power distribution layer;

a clock function layer in communication with the power distribution layer;

switch planes in communication with the clock function layer;

an interconnection links layer for connecting to another interconnection links layer of another of said set of switch modules via said set of links, said interconnection links layer for detecting the failure in said one link and redirecting communication from the failed link to the extra link; and an applications layer in communication with the set of links and providing data packets to said interconnections links layer, said applications layer operating independently of said detecting and re-directing aspects of said interconnection links layer.

17. A switch node according to claim 16, including:

multiple extra links, each available to take the place of any failed ones of the first set of links in carrying assigned ones of the data packets.

18. A switch node according to claim 16, further including:
   internal routing taggers to tag the data packets to particular ones of the set of links until the one link fails whereupon said taggers instead tag the data packets otherwise destined for the failed link to the extra link.

19. A single switch node comprising:
   a number N of first links and a number M of second links, all connecting first and second switch modules contained within physical boundaries of the single switch node, each of the first and second node-internal switch modules including:
   a fault detector to determine N number of currently operable ones of said N&M first and second links;
   a switch core communicating between at least one device circuit and the first and second links to route data packets from the device circuits to at least the N number of currently operable first and second links; and
   a device-side switch port interface between the device circuit and the switch core to add internal routing tags to the data packets identifying only the N number of currently operable first and second links; and
   a link-side switch port interface between the switch core and the links to read the internal routing tags and route the data packets to the N number of currently operable first and second links.

20. A switch node according to claim 19, wherein:
   N is one and M is one.

21. A switch node according to claim 19, wherein:
   N is at least two and M is one.

22. A switch node according to claim 19, wherein:
   N is at least two and M is at least two.

23. A switch node according to claim 19, further including:
   N+M number of link exchanges coupled between the switch core and corresponding ones of the first and second links; and wherein:
   the link-side switch port interface includes N+M link-side switch port interfaces, one per link exchange.

24. A switch node according to claim 19, wherein:
   each switch module includes device circuits, and
   the device-side switch port interface includes multiple device-side switch port interfaces, one per device circuit.

25. A switch node according to claim 19, wherein each module includes:
   a power distribution layer;
   a clock function layer in communication with the power distribution layer;
   switch planes in communication with the clock function layer;
   an interconnection links layer for connecting to another interconnection links layer of another of said set of switch modules via said first and second links, said interconnection links layer for detecting faults in said links and redirecting communication to one of said first and second links whenever faults are detected in the other of said links; and
   an applications layer in communication with the interconnection links and providing data packets to said interconnections links layer, said applications layer operating independently of said detecting and re-directing aspects of said interconnection links layer.

26. A switch node according to claim 12, wherein each switch module includes:
   a power distribution layer;
   a clock function layer in communication with the power distribution layer;
   switch planes in communication with the clock function layer;
   an interconnection links layer for connecting to another interconnection links layer of another of said set of switch modules via said first and second links, said interconnection links layer for detecting faults in said links and redirecting communication to one of said first and second links whenever faults are detected in the other of said links; and
   an applications layer in communication with the interconnection links and providing data packets to said interconnections links layer, said applications layer operating independently of said detecting and re-directing aspects of said interconnection links layer.

27. A module according to claim 5, wherein the module includes:
   a power distribution layer;
   a clock function layer in communication with the power distribution layer;
   switch planes in communication with the clock function layer;
   an interconnection links layer for connecting to another interconnection links layer of another of said set of switch modules via at least first and second redundant links, said interconnection links layer for detecting faults in said links and redirecting communication to one of said first and second links whenever faults are detected in the other of said links; and
   an applications layer in communication with the interconnection links and providing data packets to said interconnections links layer, said applications layer operating independently of said detecting and re-directing aspects of said interconnection links layer.

28. The method in claim 1, wherein each module includes:
   a power distribution layer;
   a clock function layer in communication with the power distribution layer;
   switch planes in communication with the clock function layer;
   an interconnection links layer for connecting to another interconnection links layer of another of said set of switch modules via at least first and second redundant links, said interconnection links layer for detecting faults in said links and redirecting communication to one of said first and second links whenever faults are detected in the other of said links; and
   an applications layer in communication with the interconnection links and providing data packets to said interconnections links layer, said applications layer operating independently of said detecting and re-directing aspects of said interconnection links layer.

* * * * *